United States Patent [19]

Jaquiss et al.

[11] 4,221,728

[45] Sep. 9, 1980

[54] STABILIZED POLYCARBONATE COMPOSITIONS

[75] Inventors: Donald B. G. Jaquiss, New Harmony; Steven W. Scott, Evansville, both of Ind.; Howard A. Vaughn, Jr., Schenectady, N.Y.; Joseph B. Williams, Mt. Vernon, Ind.

[73] Assignee: General Electric Company, Pittsfield, Mass.

[21] Appl. No.: 865,292

[22] Filed: Dec. 28, 1977

[51] Int. Cl.$^2$ .................. C08L 69/00; C08L 83/06
[52] U.S. Cl. .................. 260/37 SB; 260/37 PC; 525/464; 525/1; 525/2
[58] Field of Search ......... 260/824 R, 47 XA, 37 SB, 260/37 PC; 528/196, 197

[56] References Cited

U.S. PATENT DOCUMENTS

| | | | |
|---|---|---|---|
| 2,595,890 | 5/1952 | Sauer | 260/448.2 |
| 2,999,835 | 9/1961 | Goldberg | 260/824 R |
| 3,028,365 | 4/1962 | Schnell et al. | 260/47 XA |
| 3,087,908 | 4/1963 | Caird | 260/824 R |
| 3,169,121 | 2/1965 | Goldberg | 260/47 XA |
| 3,334,154 | 8/1967 | Kim | 260/860 |
| 3,634,312 | 1/1972 | Babillis et al. | 260/47 XA |
| 3,809,676 | 5/1974 | Liberti | 260/47 XA |
| 3,971,756 | 7/1976 | Bialous et al. | 260/824 R |

*Primary Examiner*—Wilbert J. Briggs, Sr.
*Attorney, Agent, or Firm*—Morgan, Finnegan, Pine, Foley & Lee

[57] ABSTRACT

A thermal oxidative stabilized polycarbonate composition comprises in admixture (a) a high molecular weight aromatic carbonate polymer and (b) a minor amount of an end-blocked polyorganohydrogen siloxane and, optionally, an organic phosphite or phosphonite and/or epoxy compound.

33 Claims, No Drawings

STABILIZED POLYCARBONATE COMPOSITIONS

This invention relates to a thermal oxidative stabilized polycarbonate composition comprising in admixture (a) a high molecular weight aromatic carbonate polymer and (b) a minor amount of an end-blocked polyorganohydrogensiloxane, optionally, further including a minor amount of a phosphite or phosphonite and/or epoxy compound.

BACKGROUND OF THE INVENTION

Polycarbonate polymers are excellent molding materials as products made therefrom have high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

Polycarbonates are, however, very difficult to fabricate from melts for the reason that the high temperatures required lead to thermal and oxidative degradation. This is especially aggravated in pigmented, e.g., titanium dioxide—containing, modifications. Degradation results in decreases in melt viscosity and development of undesirable color. Although phosphites alone appear to have an advantageous stabilizing effect, in general, higher than desirable amounts are necessary. Furthermore, it is known from U.S. Pat. Nos. 3,087,908, and 2,999,835 that polycarbonates can be admixed with polydiorganosiloxanes to produce melt processed materials which are free from blemishes, undesirable color effects, bubbles and craters. However, there is no suggestion that thermal oxidative stability can be improved by this expedient, especially when pigments are also present.

It has now been discovered that minor effective amounts of chain-stopped polyorganohydrogensiloxanes are remarkably effective per se and in combination with organic phosphites and phosphonites and/or epoxides to improve the stability of polycarbonate resins. In contrast to the additives of Caird, incorporated herein by reference, the superiority of those herein is believed to be due to the unique presence of silicon bonded active hydrogen—which confers anti-oxidant-reducing agent-thermal stabilizing properties in the additive.

DESCRIPTION OF THE INVENTION

According to this invention there are provided stabilized thermoplastic compositions comprising in admixture (a) a high molecular weight aromatic carbonate polymer and a minor amount of (b) a chain-stopped polyorganohydrogensiloxane.

In the practice of this invention, the chain-stopped polyorganohydrogensiloxane is preferably made up of repeating units of the formula:

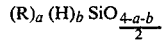

wherein R is a monovalent hydrocarbon radical free of aliphatic unsaturation, a is from 1.00 to 2.10, b is from 0.1 to 1.0, and the sum of a plus b is from about 2.00 to 2.67.

The radical R can be, for example, an alkyl radical, such as methyl, ethyl, propyl, butyl, pentyl, hexyl, heptyl, octyl, and the like, a cycloalkyl radical, such as cyclohexyl, cycloheptyl, and the like, an aryl radical, such as phenyl, tolyl, xylyl, and the like, an aralkyl radical, such as benzyl, phenylethyl, phenylpropyl, and the like, such radicals substituted by one or more inorganic atoms or radicals, e.g., halogenated radicals of the aforementioned type such as chloromethyl, chloropropyl, chlorophenyl, dibromophenyl, nitrophenyl, and the like. In the formula, where R can represent more than one radical, these can all be the same or they can be any two or more of the aforementioned. In all cases R comprising methyl are preferred.

The amount of chain-stopped polyorganohydrogensiloxane employed in the practice of this invention may vary from about 0.0001 to about 10.0 parts by weight per hundred parts of aromatic carbonate polymer. Preferably, this component is employed in amounts of from 0.005 to 0.5 parts by weight per hundred parts of aromatic carbonate polymer.

Preferred members of the family of polyorganohydrogensiloxanes comprise compounds of Formula I:

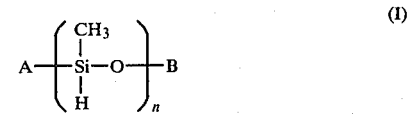

wherein A and B are terminal units independently selected from

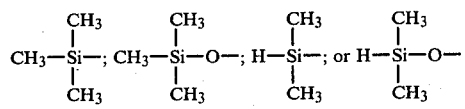

and n is an integer of from about 1 to about 500.

Especially preferably, the terminal units in component (b) comprise mixed trimethylsiloxy and dimethylhydrogensiloxy units.

Also contemplated are a family of polyorganohydrogensiloxanes of Formula II:

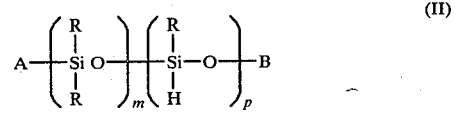

wherein R, A and B are as above defined, and m and p are integers of from 1 to 500.

Still another preferred family is of Formula III:

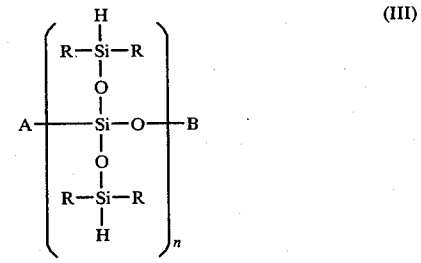

wherein R, A, B and n are as above defined and R in all cases is preferably methyl. Typically, in most preferred species, Formula I will contain about 1.6% by weight of active hydrogen; a liquid of Formula II, A and B each being dimethylhydrogensilyl; m and p respectively of about 103 and 22, will contain about 0.25% active hydrogen; a compound of Formula II, A and B being trimethylsilyloxy and trimethylsilyl, respectively, the ratio of m to p being about 5.4; will contain also about 0.25% active hydrogen, and a compound of Formula III, n being about 26 will contain about 0.9% of active hydrogen. In general, the higher the active hydrogen content, the less of component (b) will be required.

Component (b) can be made by procedures known to those skilled in the art and some members of the family are commercially available, e.g., poly(methylhydrogensiloxane) of active hydrogen 1.6 wt.% content, is available from General Electric Co., Waterford, N.Y. The linear methyl siloxanes having hydrogen linked directly to silicon are also described in Sauer, U.S. Pat. No. 2,595,890, assigned to the assignee herein, as well as in W. Noll, Chemistry and Technology of Silicones, Academic Press, London and New York, 1968.

The high molecular weight aromatic polycarbonates that can be employed herein as component (a) are homopolymers and copolymers and mixtures thereof which have an I.V. of 0.40 to 1.0 dl./g. as measured in methylene chloride at 25° C. that are prepared by reacting a dihydric phenol with a carbonate precursor. Typical of some of the dihydric phenols that may be employed in the practice of this invention are bisphenol, i.e., (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3′,5′-tetrachloro-4,4′-dihydroxydiphenyl) propane, 2,2-(3,5,3′,5′-tetrabromo-4,4′-dihydroxydiphenyl) propane, (3,3′-dichloro-4,4′-dihydroxydiphenyl) methane. Other dihydric phenols of the bisphenol type are also available and are disclosed in U.S. Pat. Nos. 2,299,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers used in this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed to make component (a) can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also contemplated as component (a) are branched polycarbonates wherein a polyfunctional aromatic compound is reacted with the dihydric phenol and carbonate precursor to provide a thermoplastic randomly branched polycarbonate.

Such polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benxophenonetetracarboxylic anhydride and the like. The preferred polyfunctional aromatic compounds are trimellitic anhydride or trimellitic acids or their haloformyl derivatives.

Contemplated as component (a) are blends of a linear polycarbonate and a branched polycarbonate.

In those embodiments of this invention which further include component (c), a phosphite or phosphonite co-stabilizer, there can be employed one or more compounds of the formula:

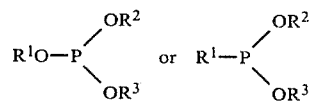

wherein $R^1$, $R^2$ and $R^3$ are independently selected from hydrogen, alkyl, aryl, cycloalkyl, aralkyl and alkylaryl radicals wherein at least one R is other than hydrogen. Preferably, the radicals have 1 to 20 carbon atoms. The alkyl may be methyl, ethyl, propyl, isopropyl, the various butyl isomers, e.g., butyl, sec-butyl, tert-butyl, the various amyl isomers, the various hexyl isomers, the various nonyl isomers, the various eicosyl isomers, etc.; the cycloalkyl may be cyclobutyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyl substituted with one or more of the above aryl groups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyl dodecylphosphite, diphenyl pentaerythritol phosphite, triphenylphosphite, di-(t-butylphenyl) octylphosphite, tris(nonylphenyl) phosphite, dipropylphenylphosphite, etc. The phosphonites include phenyl diphenyl phosphonite and diphenyl pentaerythritol phosphonite. The preferred phosphites to be employed herein are trialkyl phosphites, e.g., tris(p-nonylphenyl) phosphite, tridecylphosphite, etc., diaryl alkyl phosphites, e.g., diphenyldecylphosphite, etc.

A family of useful phosphites and phosphonites is derived from pentaerythritol and is of the formulae:

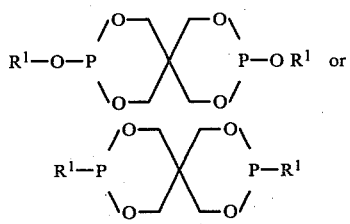

wherein $R^1$ is independently, alkyl, aryl, cycloalkyl, aralkyl or alkaryl.

The phosphites and phosphonites can be easily prepared, e.g., by reacting the corresponding carbinol with phosphorous trichloride, preferably in the presence of an acid acceptor, to produce the phosphite, or with the corresponding dichlorophosphine produce the phosphonite. These compounds are also commercially available, e.g. tris(nonylphenyl) phosphite from Goodyear Co. under the name Polygard.

The amount of component (c) to be used can vary broadly, but preferably it will be in the range of from about 0.005 to about 1.0 parts by weight per 100 parts by weight of aromatic carbonate polymer (a), and preferably from about 0.05 to about 0.25 parts by weight.

The co-stabilizing epoxy compounds (d) which can be employed are selected from the following:

I. Derivatives of epoxy ethane represented by the following formula:

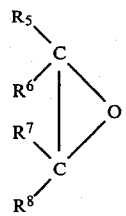

wherein $R^5$, $R^6$, $R^7$ and $R^8$ are independently selected from hydrogen, alkyl of 1–24 carbon atoms, aryl of 6–24 carbon atoms, $-CH_2OR'$, $-CH_2OCOR'$, $-CH_2OCOR'X$, $-'COOCH_2X$, $-CH_2OR''OCH_2X$, wherein $R'$ is selected from alkyl of 1–24 carbon atoms or aryl of 6 to 24 carbon atoms and wherein $R''$ is alkylene of 1–24 carbon atoms and X is an oxirane ring.

II. Derivatives of epoxy cyclohexane represented by the following formula:

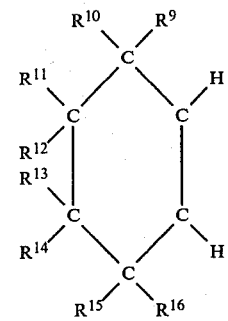

wherein $R^9$ through $R^{16}$ are independently selected from hydrogen, alkyl radicals of 1–24 carbon atoms, $-COR^{17}$, $-OCOR^{17}$, $-COOR^{18}X$, $-OCOR^{18}-COOX$ wherein $R^{17}$ is alkyl of 1–24 carbon atoms and $R^{18}$ is alkylene of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperature employed in preparing molded articles from the composition of this invention.

The amount of epoxy to be employed can vary from 0.01 to 0.5 weight percent based on the weight of the polymer composition and is preferably 0.03 to 0.3 weight percent. While more than 0.5 weight percent of epoxy can be employed, it has been found that higher amounts tend to degrade the physical properties of the polycarbonate and thereby reduce the molded articles.

Typical of the epoxy compounds are 3,4-epoxycyclohexylmethyl 3,4-epoxycyclohexane carboxylate, 3,4-epoxy-6-methylcyclohexylmethyl 3,4-epoxy-6-methylcyclohexane carboxylate, 2,3-epoxycyclohexylmethyl, 3,4-epoxycyclohexane carboxylate, 3,4-epoxycyclohexyl ethyleneoxide, cyclohexyl 3,4-epoxycyclohexane carboxylate, 3,4-epoxy-6-methylcyclohexylmethyl 6-methylcyclohexyl carboxylate, bisphenol-A diglycidyl ether, tetrabromobisphenol-A diglycidyl ether, di-glycidyl ester of phthalic acid, diglycidyl ester of hexahydrophthalic acid, epoxidized soybean oil, epoxidized linseed oil, bisepoxycyclohexyl adipate, butadiene diepoxide, tetraphenylethylene-epoxide, octyl epoxy tallate and epoxidized polybutadiene. Also, 3,4-dimethyl-1,2-epoxycyclohexane, 3,5-dimethyl 1,2-epoxycyclohexane, 3-methyl-5-tert butyl-1,2-epoxy cyclohexane, octadecyl 2,2-dimethyl-3,4-epoxycyclohexane carboxylate, N-butyl 2,2-dimethyl-3,4-epoxycyclohexane carboxylate, cyclohexyl 2-methyl-3,4-epoxycyclohexane carboxylate, N-butyl 2-isopropyl-3,4-epoxy-5-methylcyclohexane carboxylate, octadecyl 3,4-epoxycyclohexane carboxylate, 2-ethylhexyl 3',4-epoxycyclohexane carboxylate, 4,6-dimethyl-2,3-epoxycyclohexyl 3',4'-epoxycyclohexane carboxylate, diethyl 4,5-epoxy-cis-1,2-cyclohexane dicarboxylate, di-n-butyl 3-tert-butyl-4,5-epoxy-cis-1,2-cyclohexane dicarboxylate. Preferably, the epoxy compound employed in the practice of this invention is 3,4-epoxycyclohexylmethyl 3,4-epoxycyclohexane carboxylate.

As has been mentioned, pigmented polycarbonates are particularly difficult to stabilize. Among the pigments that are used can be mentioned fine particles of titanium dioxide, zinc oxide, zinc sulfide, basic lead carbonate, antimony oxide, zirconium oxide, potassium titanate, the so-called white (hiding pigments), filler pigments, e.g., clays, silica, quartz, talc, mica, wollastonite, asbestos, glass fibers, and the like, and colored pigments, e.g., ultramarine blude, chromium oxide, and the like. The pigments are conventionally employed in amounts of about 0.001 to about 10 percent by weight. This invention is especially useful to protect pigmented polycarbonate compositions wherein the pigment is titanium dioxide. Titanium dioxide is generally used at levels of from about 0.5 to about 3 parts by weight per 100 parts by weight of aromatic carbonate resin.

The compositions of the instant invention may be prepared by blending the high molecular weight aromatic polycarbonate with the additive by conventional methods.

Obviously, other materials can also be employed with the aromatic carbonate polymer of this invention and include such materials as anti-static agents, ultraviolet stabilizers, reinforcing fillers and the like.

DESCRIPTION OF THE PREFERRED EMBODIMENTS

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLES 1–3

The materials are dry blended and extruded at about 550° F., pelletized and injection molded into ⅛″ thick parts at 600° F. and 680° F. stock temperature and evaluated for their whiteness (whiteness index of 100=perfect white color) and yellowness index with ASTM whiteness index test E 313 and ASTM yellowness index test D 1935. The compositions employed and the results obtained are set forth in Table 1:

Table 1

| Composition Comprising Polycarbonate, Poly(methylhydrogensiloxane), Phosphite And Pigment | | | | |
|---|---|---|---|---|
| Example | 1A* | 1 | 2 | 3 |
| Composition (parts by weight) | | | | |
| Poly(4,4'-dihydroxy diphenylpropane)carbonate[a] | 98 | 98 | 98 | 98 |
| Poly(methylhydrogensiloxane)[b] | — | 0.01 | 0.05 | 0.10 |
| Tris (nonylphenyl) phosphite[c] | 0.1 | 0.1 | 0.1 | 0.1 |
| Titanium dioxide | 2.0 | 2.0 | 2.0 | 2.0 |
| Properties | | | | |
| Whiteness index as molded at: | | | | |
| 600° F. | 52.4 | 60.6 | 70.3 | 71.4 |
| 680° F. | 33.9 | 44.8 | 65.7 | 68.3 |
| Yellowness index as molded at: | | | | |
| 600° F. | 11.4 | 8.5 | 5.2 | 4.7 |
| 680° F. | 18.4 | 14.2 | 6.7 | 5.8 |

*Control
[a]General Electric Company, LEXAN 104, 0.55 (intrinsic viscosity)
[b]General Electric Company, DF 1040 poly(methylhydrogensiloxane), contains hydrogen 1.6% by weight.
[c]Goodyear Chemical Company (POLYGARD)

It can be seen that not only is the whiteness index substantially improved, but also the yellowness index is maintained at a low figure by using the stabilizer in accordance with this invention.

EXAMPLES 4–5

The materials are dry blended and extruded at about 550° F., pelletized and evaluated for melt viscosity and melt stability in a Gottfert rheometer at 300° C. The compositions employed and the results obtained are set forth in Table 2:

Table 2

| Compositions of Aromatic Polycarbonate, Poly(methylhydrogensiloxane), Pigment and Phosphite | | | | | |
|---|---|---|---|---|---|
| Example | 4A* | 4B* | 4C* | 4 | 5 |
| Composition (parts by weight) | | | | | |
| Poly(4,4'-dihydroxy diphenylpropane)carbonate[a] | 100 | 98 | 98 | 98 | 98 |
| titanium dioxide | — | 2.0 | 2.0 | 2.0 | 2.0 |
| phosphite stabilizer[d] | — | — | 0.1 | 0.1 | 0.1 |
| poly(methylhydrogensiloxane)[b] | — | — | — | 0.05 | 0.1 |
| Properties | | | | | |
| 7 min. melt viscosity, poise | 5140 | 4000 | 4470 | 4950 | 5050 |
| 40 min. melt viscosity, poise | 4860 | 2610 | 3080 | 4360 | 4540 |
| % Δ melt viscosity at 7 and 40 min. | 5.4% | 34.7% | 31.0% | 12.0% | 10.1% |

*Control
[a]Same as Table 1
[b]Same as Table 1
[d]2:1 — 3,4-epoxycyclohexylmethyl 3,4-epoxycyclohexane carboxylate/diphenyloctyl phosphite.

It can be seen that examples according to this invention provide efficiently thermally, stabilized polycarbonate compositions.

EXAMPLES 6–7

The procedure of Examples 1–3 are repeated, except that extrusion blending is carried out at about 525° F. and molding is carried out at 550°, 600° and 650° F. The compositions employed and the results obtained in the whiteness index test are set forth in Table 3.

Table 3

| Compositions Comprising Aromatic Polycarbonate, Poly(methylhydrogensiloxane), Pigments and Phosphite | | |
|---|---|---|
| Example | 6A* | 6 | 7 |
| Compositions (parts by weight) | | |
| Poly(4,4'-dihydroxy diphenylpropane)car- | | |

Table 3-continued
Compositions Comprising Aromatic Polycarbonate, Poly(methylhydrogensiloxane), Pigments and Phosphite

| Example | 6A* | 6 | 7 |
|---|---|---|---|
| bonate$^a$ | 100 | 100 | 100 |
| Poly(methylhydrogensiloxane)$^b$ | — | 0.1 | 0.05 |
| Titanium dioxide | 1.8 | 1.8 | 1.8 |
| Ultramarine Blue Pigment | 0.003 | 0.003 | 0.003 |
| Tris(nonylphenyl) phosphite | 0.075 | 0.075 | 0.075 |
| Properties | | | |
| Whiteness index as moled at: | | | |
| 550° F. | | 70.5 | 78.3 | 84.8 |
| 600° F. | 65.8 | 74.8 | 84.8 |
| 650° F. | 53.9 | 67.4 | 83.9 |

*Control
$^a$Same as Table 1
$^b$Same as Table 1

It is seen that the compositions according to this invention retain their whiteness under thermal extremes substantially better than corresponding prior art compositions.

EXAMPLES 8–9

The materials are blended, extruded and pelletized as described above, molded at 600° F. and evaluated for whiteness, yellowness and melt viscosity at 300° C. The compositions employed and the results obtained are set forth in Table 4:

Table 4
Compositions Comprising Aromatic Carbonate, Poly(methylhydrogensiloxane), Pigment and Optional Phosphite

| Example | 8A* | 8 | 9A* | 9 |
|---|---|---|---|---|
| Compositions (parts by weight) | | | | |
| Poly(4,4'-dihydroxy diphenylpropane)carbonate$^a$ | 100 | 100 | 100 | 100 |
| Poly(methylhydrogensiloxane)$^b$ | — | 0.10 | — | 0.10 |
| Titanium dioxide | 2.0 | 2.0 | 2.0 | 2.0 |
| Diphenyldecyl phosphite | — | — | 0.1 | 0.1 |
| Properties | | | | |
| Whiteness index as molded at: | | | | |
| 600° F. | 50.4 | 70.5 | 67.1 | 75.7 |
| Yellowness index as molded at: | | | | |
| 600° F. | 12.7 | 5.6 | 6.7 | 3.9 |
| Melt viscosity at 300° C., poise | 5200 | 5400 | 4500 | 5400 |

*Control
$^a$Same as Table 1
$^b$Same as Table 1

It can be seen that the compositions according to this invention are sufficiently and thermally stabilized under these extruded, molded compositions by using the additives of this invention.

EXAMPLES 10–13

The foregoing procedures are repeated, using instead of poly(methylhydrogensiloxane) terminated with a mixture of trimethylsiloxy and dimethylhydrogensiloxane units, respectively, and SiH containing fluid of the structure:

$$\left( \begin{array}{c} H \\ | \\ CH_3-Si-CH_3 \\ | \\ O \\ | \\ -Si-O- \\ | \\ O \\ | \\ CH_3Si-CH_3 \\ | \\ H \end{array} \right)_m \quad \text{Ex. 9}$$

wherein m is equal to about 26 and which contains about 0.9 wt.% active hydrogen; a 100 cps copolymer of the formula:

$$H-\underset{\underset{CH_3}{|}}{\overset{\overset{CH_3}{|}}{Si}}-\left(\underset{\underset{CH_3}{|}}{\overset{\overset{CH_3}{|}}{Si}}-O\right)_p-\left(\underset{\underset{H}{|}}{\overset{\overset{CH_3}{|}}{Si}}-O\right)_n-\underset{\underset{CH_3}{|}}{\overset{\overset{CH_3}{|}}{Si}}-H \quad \text{Ex. 10}$$

wherein p is about 103 and n is about 22, and which contains 0.25 wt.% active hydrogen; and a 30 cps linear fluid of the structure:

$$CH_3-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_x-\left(\underset{\underset{H}{|}}{\overset{\overset{CH_3}{|}}{Si}}-O\right)_t-\underset{\underset{CH_3}{|}}{\overset{\overset{CH_3}{|}}{Si}}-CH_3 \quad \text{Ex. 11}$$

wherein s is about 17.5 and t is about 3.2, and which also contains 0.25 wt.% active hydrogen.

The compositions and results are set forth in Table 5:

Table 5
Compositions Comprising Aromatic Carbonate, Silicone-bonded Hydrogen Compounds, Pigment, And Optional Phosphite

| Example | 10A* | 10 | 11 | 12 | 13A* | 13 |
|---|---|---|---|---|---|---|
| Compositions | | | | | | |
| Poly(4,4-dihydroxy diphenyl propane) carbonate$^a$ | 100 | 100 | 100 | 100 | 90 | 90 |
| Titanium dioxide | 2 | 2 | 2 | 2 | — | — |
| Diphenyldecylphosphite | 0.1 | 0.1 | 0.1 | 0.1 | 0.1 | 0.1 |
| Ex. 10 | — | 0.1 | — | — | — | — |
| Ex. 11 | — | — | 0.1 | — | — | — |
| Ex. 12 | — | — | — | 0.1 | — | — |
| Poly(methyl hydrogen siloxane)$^b$ | — | — | — | — | — | 0.15 |
| Novaculite ($\alpha$-quartz)$^c$ | — | — | — | — | 10 | 10 |
| Properties | | | | | | |
| Yellowness index as molded at: | | | | | | |
| 600° F. | 7.4 | 4.9 | 5.8 | 6.2 | | |
| Gardner impact, in. lbs. | | | | | 200 | 250 |
| Melt viscosity at 300° C., poise | 4150 | 5700 | 5300 | 5200 | 5700 | 6300 |

*Control
$^a$same as Table 1
$^b$same as Table 1
$^c$Malvern Minerals (daper NOVACITE).

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

We claim:

1. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units selected from the group consisting of (1) units of the formula

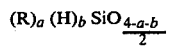

wherein R is a monovalent hydrocarbon radical free of aliphatic unsaturation, a is from 1.00 to 2.10, b is from 0.1 to 1.0, and the sum of a plus b is from 2.00 to 2.67;

(2) units of the formula

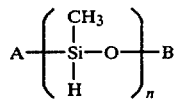

wherein A and B are terminal units independently selected from

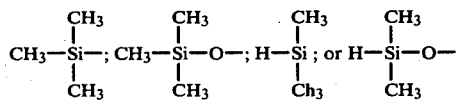

and n is an integer of from about 1 to about 500, and (3) units of the formula

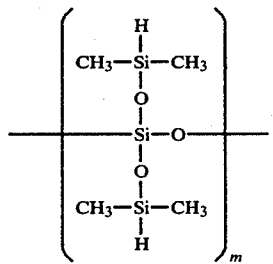

wherein m is equal to about 26.

2. A composition as defined in claim 1 wherein component (b) is present in an amount of from about 0.001 to about 10.0 parts by weight per hundred parts by weight of aromatic carbonate polymer (a).

3. A composition as defined in claim 1 wherein the aromatic carbonate polymer component (a) is derived from bisphenol-A.

4. A composition as defined in claim 1 wherein the aromatic carbonate polymer component (a) is a copolymer derived from bisphenol-A and tetrabromo bisphenol-A.

5. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units of the formula:

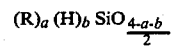

wherein R is a monovalent hydrocarbon radical free of aliphatic unsaturation, a is from 1.00 to 2.10, b is from 0.1 to 1.0, and the sum of a plus b is from about 2.00 to 2.67.

6. A composition as defined in claim 5 wherein R is methyl.

7. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units of the formula:

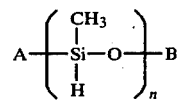

wherein A and B are terminal units independently selected from

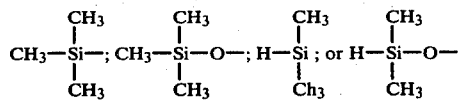

and n is an integer of from about 1 to about 500.

8. A composition as defined in claim 7 wherein the terminal units in component (b) comprise mixed trimethylsiloxy and dimethylhydrogensiloxy units.

9. A composition as defined in claim 8 wherein said component (b) comprises about 1.6 percent by weight of active, silicon-bonded hydrogen.

10. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units of the formula:

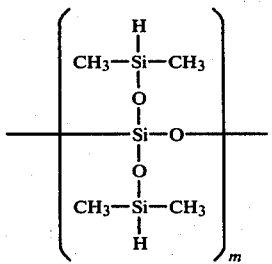

wherein m is equal to about 26.

11. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units of the formula:

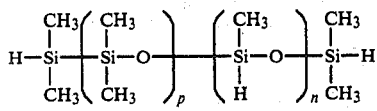

wherein p is about 103 and n is about 22.

12. A thermal and oxidatively stabilized thermoplastic composition consisting essentially of in admixture (a) a high molecular weight aromatic carbonate polymer and a minor amount of (b) a chain-stopped polyorganohydrogen-siloxane comprising units of the formula:

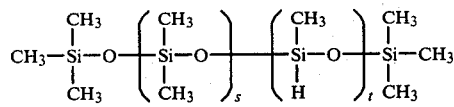

wherein s is about 17.5 and t is about 3.2.

13. A composition as defined in claim 1 which further includes a pigment.

14. A composition as defined in claim 13 wherein said pigment is titanium dioxide.

15. A composition as defined in claim 1 which further includes a stabilizing amount of (c) an organophosphite or organophosphonite of the formulae:

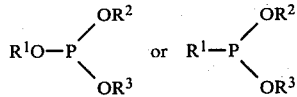

wherein $R^1$, $R^2$ and $R^3$ are independently selected from hydrogen, alkyl, aryl, cycloalkyl, aralkyl and alkylaryl radicals wherein at least one such R is other than hydrogen.

16. A composition as defined in claim 15 wherein the amount of stabilizer (c) comprises from about 0.005 to about 1.0 parts by weight based on 100 parts by weight of aromatic carbonate polymer (a).

17. A composition as defined in claim 15 wherein the stabilizer (c) comprises tri(nonylphenyl) phosphite.

18. A composition as defined in claim 15 wherein the stabilizer (c) comprises diphenyldecyl phosphite.

19. A composition as defined in claim 1 which further includes a stabilizing amount of a compound of the formulae:

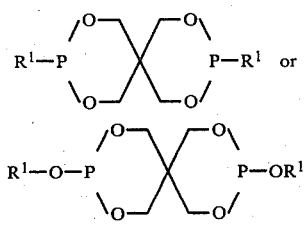

wherein $R^1$ is, independently, alkyl, aryl, cycloalkyl, aralkyl or alkaryl.

20. A composition as defined in claim 1 which further includes a stabilizing amount of (d) an epoxy compound selected from the following:

I. Derivatives of epoxy ethane represented by the following formula:

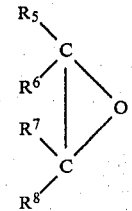

wherein $R^5$, $R^6$, $R^7$ and $R^8$ are independently hydrogen, alkyl of 1–24 carbon atoms, aryl of 6–24 carbon atoms, —CH$_2$OR′, —CH$_2$OCOR′, —CH$_2$OCOR′X, —′-COOCH$_2$X, or —CH$_2$OR″OCH$_2$X, wherein R′ is alkyl of 1–24 carbon atoms or aryl of 6 to 24 carbon atoms and wherein R″ is alkylene of 1–24 carbon atoms and X is an oxirane ring.

II. Derivatives of epoxy cyclohexane represented by the following formula:

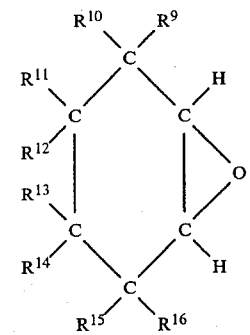

wherein $R^9$ through $R^{16}$ are independently selected from hydrogen, alkyl of 1–24 carbon atoms, —COOR$^{17}$, —OCOR$^{17}$, —COOR$^{18}$X, or —OCOR$^{18}$—COOX wherein $R^{17}$ is alkyl of 1–24 carbon atoms and $R^{18}$ is alkylene of 1–24 carbon atoms and X is an oxirane ring.

21. A composition as defined in claim 18 which further includes a stabilizing amount of an organophosphite or organophosphonite of the formulae:

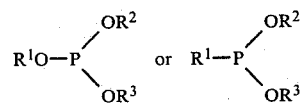

wherein $R^1$, $R^2$ and $R^3$ are independently selected from hydrogen, alkyl, aryl, cycloalkyl, aralkyl and alkylaryl radicals wherein at least one such R is other than hydrogen.

22. A composition as defined in claim 15 wherein the stabilizer (c) comprises diphenyloctyl phosphite in combination with 3,4-epoxycyclohexylmethyl 3,4-epoxycyclohexane carboxylate.

23. A composition as defined in claim 15 which further includes a pigment.

24. A composition as defined in claim 23 wherein said pigment is titanium dioxide.

25. A method of preparing a thermoplastic composition which is stabilized against thermal and oxidative degradation comprising adding to a high molecular weight aromatic carbonate polymer a minor amount of a chain-stopped polyorganohydrogen-siloxane, comprising units selected from the group consisting of
(1) units of the formula

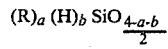

wherein R is a monovalent hydrocarbon radical free of aliphatic unsaturation, a is from 1.00 to 2.10, b is from 0.1 to 1.0, and the sum of a plus b is from 2.00 to 2.67;
(2) units of the formula

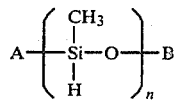

wherein A and B are terminal units independently selected from

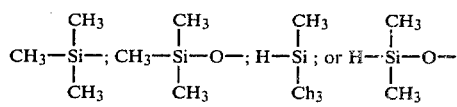

and n is an integer of from about 1 to about 500, and
(3) units of the formula

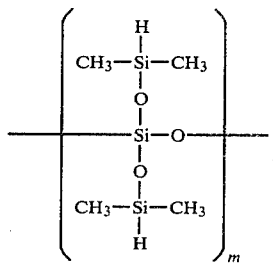

wherein m is equal to about 26.

26. A method according to claim 25 wherein the chain-stopped polyorganohydrogen-siloxane is added in an amount from about 0.001 to about 10.0 parts by weight per one hundred parts by weight of aromatic carbonate polymer.

27. A method according to claim 25 wherein the chain-stopped polyorganohydrogen-siloxane comprises units of the formula:

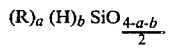

wherein R is a monovalent hydrocarbon radical free of aliphatic unsaturation, a is from 1.00 to 2.10, b is from 0.1 to 1.0, and the sum of a plus b is from about 2.00 to 2.67.

28. A method according to claim 25 wherein R is methyl.

29. A method according to claim 25 wherein the chain-stopped polyorganohydrogen-siloxane is of the formula:

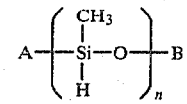

wherein A and B are terminal units independently selected from

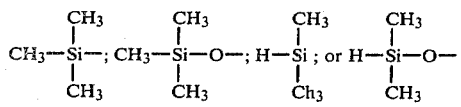

and n is an integer of from about 1 to about 500.

30. A method according to claim 29 wherein the terminal units in the chain-stopped polyorganohydrogen-siloxane comprises mixed trimethylsiloxy and dimethylhydrogen-siloxy units.

31. A method according to claim 25 wherein the chain-stopped polyorganohydrogen-siloxane is of the formula:

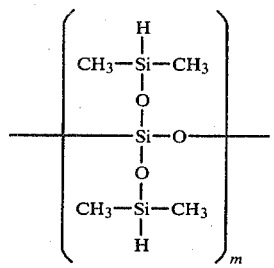

wherein m is equal to about 26.

32. A method according to claim 25 wherein the chain-stopped polyorganohydrogen-siloxane is of the formula:

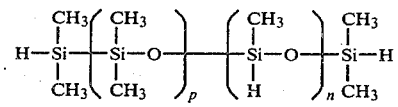

wherein p is about 103 and n is about 22.

33. A method according to claim 25 wherein the chain-stopped polyorganohydrogen-siloxane is of the formula:

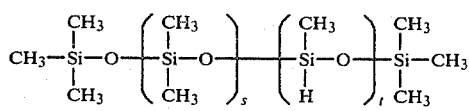

wherein s is about 17.5 and t is about 3.2.

* * * * *

UNITED STATES PATENT AND TRADEMARK OFFICE
CERTIFICATE OF CORRECTION

PATENT NO. : 4,221,728
DATED : 9/9/80
INVENTOR(S) : Donald B.G. Jaquiss, et al

It is certified that error appears in the above–identified patent and that said Letters Patent are hereby corrected as shown below:

Column 7, line 16, "blude" should be --blue--.

Column 10, line 31, "x" should be --s--.

Signed and Sealed this

Twenty-fifth Day of August 1981

[SEAL]

Attest:

Attesting Officer

GERALD J. MOSSINGHOFF
Commissioner of Patents and Trademarks